United States Patent [19]

Shah

[11] 3,739,295

[45] June 12, 1973

[54] LASER WITH MEANS FOR SUPPRESSING BACK-GROUND FLUORESCENCE IN THE OUTPUT

[75] Inventor: Jagdeep Chandravadan Shah, Matawan, N.J.

[73] Assignee: Bell Telephone Laboratories, Incorporated, Murray Hill, Berkeley Heights, N.J.

[22] Filed: Apr. 3, 1972

[21] Appl. No.: 240,480

[52] U.S. Cl. ............................................. 331/94.5
[51] Int. Cl. ............................................. H01s 3/08
[58] Field of Search ................. 331/94.5; 350/160; 250/199

[56] References Cited
UNITED STATES PATENTS 3,443,243   5/1969   Patel ................................ 331/94.5
3,663,890   5/1972   Schulthess et al. ................ 331/94.5

*Primary Examiner*—William L. Sikes
*Attorney*—W. L. Keefauver

[57] ABSTRACT

A tunable laser in which the direction of the output is invariant with frequency and is free of background fluorescence. The resonator includes a grating to tune the laser, a reflector that forms an auxiliary resonator with the grating, and a beam splitter therebetween that couples out a portion of the light returning from the grating through an aperture toward the reflector. The auxiliary resonator may employ nonreciprocal optics to reduce losses.

4 Claims, 7 Drawing Figures

LASER WITH MEANS FOR SUPPRESSING BACK-GROUND FLUORESCENCE IN THE OUTPUT

BACKGROUND OF THE INVENTION

This invention relates to means for supressing background fluorescence in the output from a laser and, in particular, to a new coupling scheme for that purpose.

Dye lasers have been the subject of extensive recent research and development because of their extremely broad tuning ranges. Such a broad tuning range is of interest in proposed future optical communication systems. More immediately, it has proven useful for laboratory applications such as spectroscopy.

In the use of a dye laser beam as the light source, it is necessary to block the background fluorescence of the laser from the sample under investigation. This condition would appear to be achievable by disposing the sample at some significant distance from the output coupling point of the laser and providing an aperture to block the fluorescence. Nevertheless, it has been found that continuous recording of data has been difficult, or even impossible, in cases in which reduced background fluorescence is of primary importance. The source of this difficulty is traceable to the preferred tuning technique for dye lasers which typically involves either the angular rotation of a diffraction grating or the angular rotation of a prism about an axis normal to the direction of incidence of the laser light. The rotation of the tuning element causes a substantial deviation in the direction of the output beam. Thus, the beam may be substantially displaced from the point of interest on the sample under investigation; and the continuous recording of data is impaired unless the relative positions of some components of the apparatus are shifted to track the rotation of the tuning element.

It should be particularly noted that both continuous recording of data and reduced background fluorescence are important conditions for studying the excitation spectra of samples of new semiconductors. The investigation of such semiconductors is important in a related branch of the laser art, namely, in the field of injection lasers. Reduced fluorescence background is also important in experiments such as Raman scattering.

Further, in future optical communication systems, it is desirable that any broadly tunable source emit its output beam in a direction that is invariant with frequency.

Thus, for use of broadly tunable lasers, such as dye lasers, both in laboratory equipment and for the use of such lasers in future optical communication systems, it is desirable to provide output coupling that suppresses background fluorescence and permits the continuous recording of data.

SUMMARY OF THE INVENTION

I have discovered a simple new arrangement for extracting a tunable output from a broad spectrum laser, such as a dye laser, and have found that this new arrangement solves the foregoing problems. In a tunable laser according to my invention, the direction of the output is invariant with frequency and is substantially free of background fluorescence.

According to a feature of my invention, the resonator includes a rotatable tuning element to tune the laser, a reflector that forms an auxiliary resonator including the tuning element, the reflector being between the tuning element and the active medium and a beam splitter disposed between the tuning element and the reflector to couple out a portion of the light returning from the tuning element through an aperture toward the reflector.

According to a subsidiary feature of my invention, the auxiliary resonator may employ nonreciprocal optics to reduce losses.

It is one advantage of my invention that it reduces the intensity of the background fluorescence of the broad spectrum laser, at least in the case of a dye laser, to less than $1 \times 10^{-7}$ of the laser intensity within a frequency band extending as much as 10 Angstroms from the laser line and gives an output beam the direction of which is independent of the laser wavelength. This new laser arrangement uses no external dispersing elements and permits a continuous recording of data as a function of laser wavelength in the typical laboratory use of the laser.

It is an additional advantage of my invention that the same arrangement may be used with gas lasers which have a series of relatively sharp laser lines which can be made to oscillate under appropriate tuning conditions. Simultaneous oscillation of such lines or insufficiently tunable selection of such lines often makes Raman spectroscopy or luminescence measurements of semiconductive crystals or other samples very difficult. Thus, my invention is applicable even to lasers such as argon ion lasers or helium-neon lasers, which are usually thought of as being narrow band lasers, and which have strong, sharp fluorescence lines in the close vicinity of the laser line. In other words, the invention is applicable to any laser medium which has a broad spectrum of possible oscillations, or which has a significant tuning bandwidth.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENTS

Figure 1:
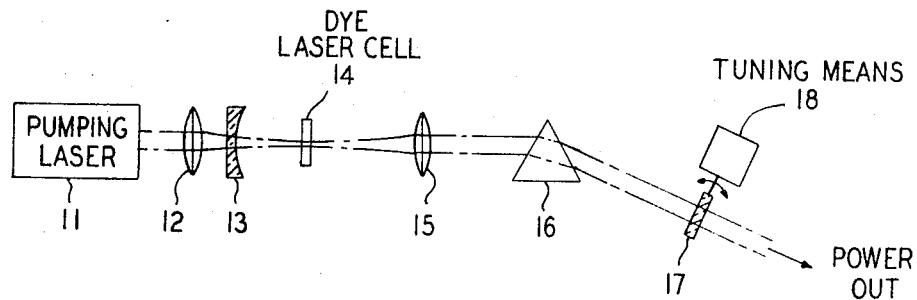
FIGS. 1, 2 and 3 show differing partially pictorial and partially block diagrammatic illustrations of prior art arrangements of tunable broadband lasers that exhibit the problems I have solved.
Figure 2:
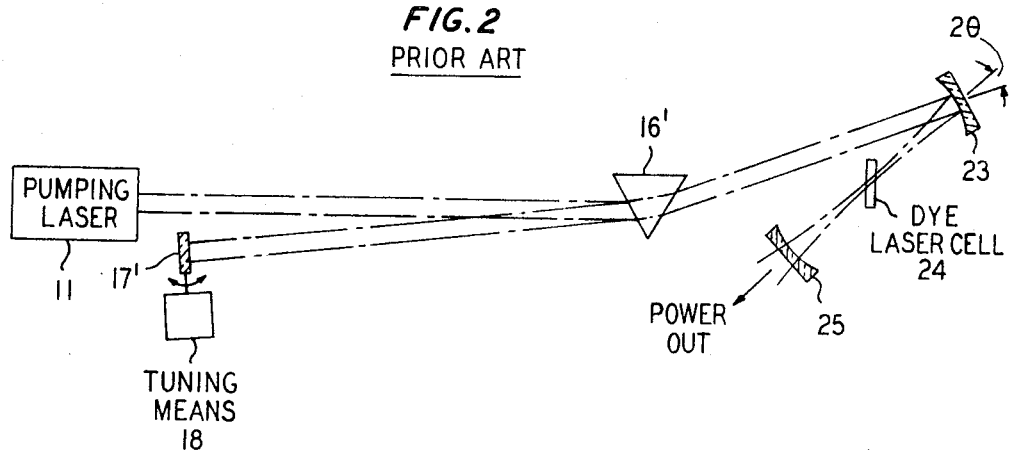

Before proceeding to a description of a detailed arrangement of my invention and its results, I shall briefly discuss three configurations of typical prior-art-type optical resonators, two of which, shown in FIGS. 1 and 2, have been used heretofore to obtain useful tunable outputs from continuous-wave dye lasers.

In the prior art arrangement of FIG. 1, a pumping laser 11 is disposed outside of the resonator of a dye laser and has its pumping beam focused through the input mirror 13 by a lens 12. The focus of the beam is arranged to lie within the dye laser cell 14 through which the dye solution is typically flowed to reduce damage effects. The optical resonator is completed by a lens 15, which recollimates the highly focused pump and dye laser beams, a dispersive prism 16 and an output mirror 17 which is typically rotated about an axis orthogonal to the path of the incident beam and parallel to the apex edge of prism 16 by means of the tuning means 18 coupled to reflector 17. The prism 16 establishes a slight angular and spatial displacement of different potential dye laser frequencies so that a particular one is selected for oscillation by the particular orientation of reflector 17.

In such a laser, the dye solution is typically rhodamine 6G in water, and the pumping laser 11 is typically an argon ion laser operating at 488 nanometers or 514.5 nanometers.

As shown on FIG. 2, the optical cavity can be folded so that reflector 23 replaces a lens as a focusing element. In addition, the pumping laser beam can be introduced directly through a dispersive prism 16' in order to reduce the threshold pumping level for oscillation by the use of a highly reflective end mirror 17'.

Figure 3:
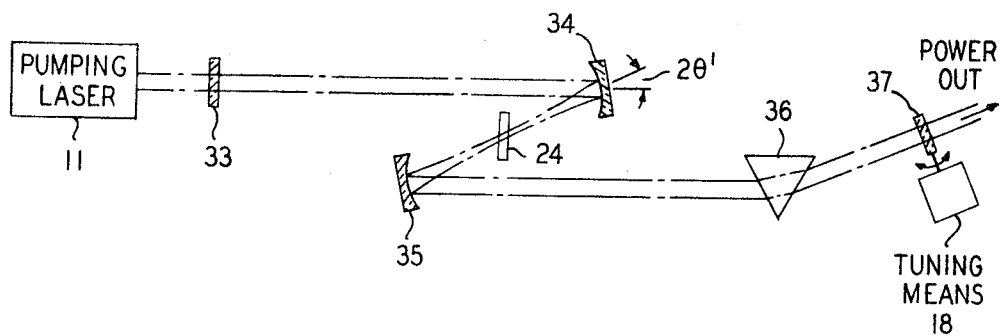

As shown in FIG. 3, a double-folded four-mirror cavity of the type disclosed and claimed in the copending patent application of R. Rosenberg and P. K. Runge, Ser. No. 224,037, filed Feb. 7, 1972 and assigned to the assignee hereof, can also be used. For reasons described in that application, the arrangement of FIG. 3 has a still lower pumping threshold for oscillation, since the astigmatism of reflectors 34 and 35 compensates the astigmatism of cell 24 in a way that is compatible with a unique beam waist within cell 24.

In all of the arrangements of FIGS. 1-3 the output beam has either a large fluorescence background amounting to about $1 \times 10^{-4}$ or $1 \times 10^{-5}$ of the laser intensity or a direction dependent upon the laser wavelength. If one attempts to solve this problem by using an external dispersing element or a spectrometer to cut down the background, a continuous recording of the data as a function of wavelength will still make desirable the use of a set of complicated mechanical linkages that have clear disadvantages. The mechanical linkages would become necessary in order to track the position of the spectrometer with the output beam and thereby enable the continuous recording of data as a function of wavelength.

Figure 4:
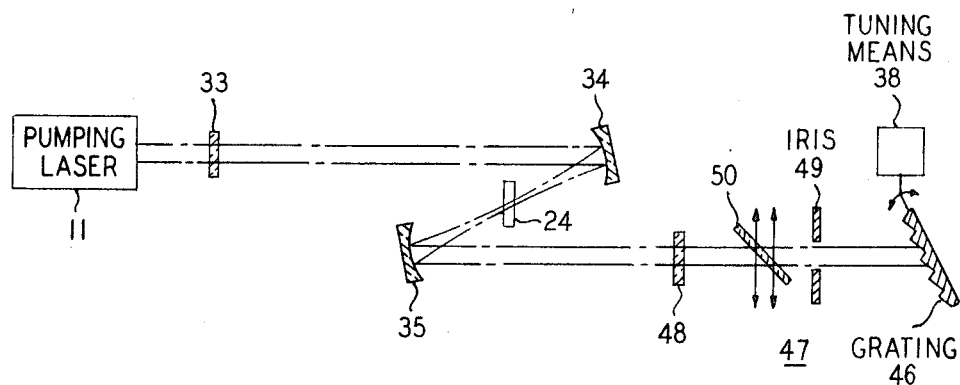
FIG. 4 shows a first partially pictorial and partially block diagrammatic illustration of a first embodiment of my invention.

In contrast, in the arrangement of FIG. 4 according to my invention, these problems are solved with a very simple arrangement. The basic idea of the arrangement of FIG. 4 is to use an auxiliary resonator comprising a mirror-grating combination 47 to tune the dye laser and to include within the mirror-grating combination 47 a beam splitter 50 to provide an output port for the laser. Specifically, the mirror-grating combination 47 also includes the reflector 48 which has sufficient reflectivity that it is considered as completing the principal resonator, the rotatable grating 46 and tuning means 38 driving grating 46. The latter components are similar to reflector 17 and tuning means 18 of FIG. 1. Further, the auxiliary resonator includes the aperture 49 inside the combination 47 to block fluorescence of the radiation returning from the grating 46 toward the beam splitter 50. The aperture inside the cavity is not essential; it could be placed at the sample, for example.

There are two outputs from the beam splitter 50. That output which has most recently passed through aperture 49 is relatively free of background fluorescence; but the component of the output which has most recently passed through reflector 48 still contains the typical background fluorescence intensity, which remains about $1 \times 10^{-4}$ to about $1 \times 10^{-5}$ of the laser intensity for a frequency range of several dozen nanometers of wavelength change from the laser line in either sense. The first-mentioned output from beam splitter 50, propagating in the upward direction, has a background intensity reduced to about $1 \times 10^{-8}$ to about $1 \times 10^{-7}$ of the laser intensity within 10 Angstroms of the laser line. This result is an improvement of several orders of magnitude.

The reason for this improvement is that the fluorescence is dispersed by grating 46 and blocked by the iris or aperture 49 on the return path from grating 46. The output direction remains invariant because it is determined by the direction of the axis needed for laser oscillation, which direction has also remained invariant. The characteristics of the laser resonator compel the latter result. In other words, no component of the laser resonator other than grating 46 has been shifted in its orientation and there are no other dispersive elements in the resonator.

A further improvement in the performance is expected if the distance between grating 46 and the entrance cell of the spectrometer (not shown) that ultimately uses the first output is increased. This distance was less than 1 meter from my initial experiments.

An obvious disadvantage of the arrangement of FIG. 4 is that the output coming from the direction of the laser active medium is being wasted. This disadvantage can be removed with a more sophisticated output coupling arrangement, as shown in the modified embodiment of FIG. 5. Here the beam splitter of FIG. 4 is replaced by a Glan-Thompson polarizer with the property that the light polarized parallel to the plane of the paper is transmitted but the light polarized orthogonal to the plane of the paper is internally reflected at the diagonal interface between the two component prisms of polarizer 60. The reflected component is coupled out through the side face of prism 16. The transmitted polarization is the dominant laser polarization of the dye laser.

Also provided between grating 46 and aperture 49 is a phase shifter 58, which may be a quartz plate or a Babinet-Soleil compensator. After passing through the phase shifter 58 from aperture 49, the beam becomes elliptically polarized. It remains so in small part even after it has returned from grating 46 through phase shifter 58, despite nearly canceling phase shifts, because the grating 46 has different reflectivities and introduces different phase shifts for the two orthogonal polarizations, respectively. It will be noted that phase shifter 58 is a reciprocal device; the nonreciprocal properties of the auxiliary resonator derive from the cooperation of phase shifter 58 and grating 46. Thus, a certain fraction of the return beam will be coupled out by Glan-Thompson polarizer 60. The amount of the output coupling can be varied by rotating the direction of the optic axis of the quartz plate, if such is used in phase shifter 58, or by an analogous adjustment. Indeed, the output coupling can be optimized in this way. It will be noted that all of the output power is monochromatic in the sense that it has the reduced background fluorescence characteristic of my invention. Also, the direction of the output beam is independent of wavelength if the polarizer 60 is designed so that the output beam is orthogonal to the surface of the exit face thereof. The upper limit on the efficiency of the arrangement of FIG. 5, as compared to the prior art embodiment of FIG. 3, is dependent upon the grating reflectivity; but it will usually be somewhat less because of feedback requirements of the laser.

The following are typical performance characteristics. Pumping the rhodamine 6G dye solution with about 1 watt of multimode, multi-line argon ion laser oscillations, the typical prior art output is about 50 milliwatts without any tuning. With the tunable arrangement of my FIG. 4, the undesired output including fluorescence, is about 25 milliwatts, whereas the useful output with reduced fluorescence is about 15 milliwatts. If grating 46 has 1,800 lines per millimeter and is blazed at 500 nanometers, the linewidth is about 0.02 nanometers to 0.03 nanometers; and the tuning range is about 50 nanometers.

Figure 5:
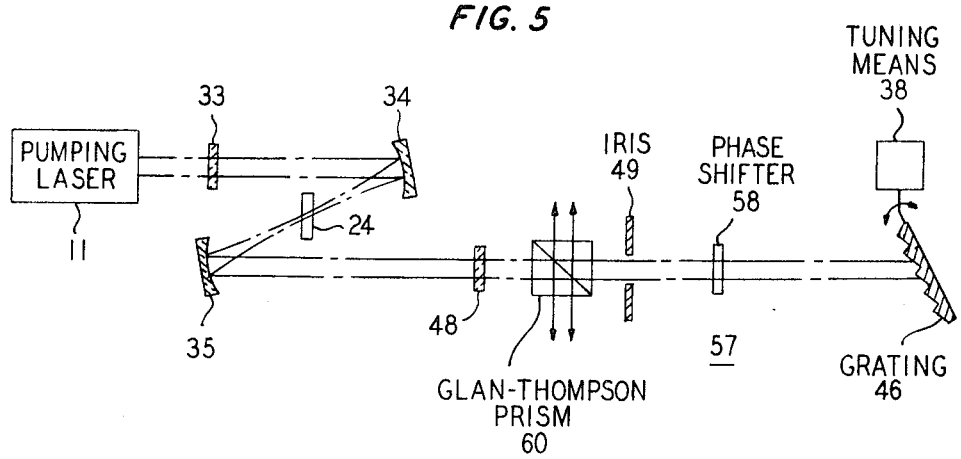
FIG. 5 shows a modification of the embodiment of FIG. 4 to reduce losses.

I would expect the embodiment of FIG. 5 to give an increased "clean" power output, as compared to that of FIG. 4, because of the lower losses.

Figure 6A:
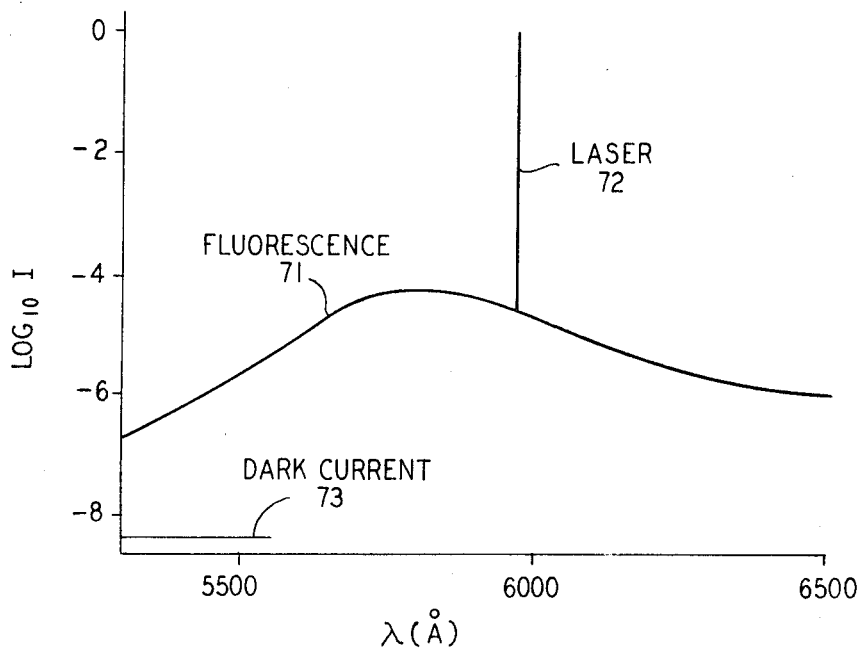
FIGS. 6A and 6B show curves which are useful in explaining the operation of my invention.
Figure 6B:
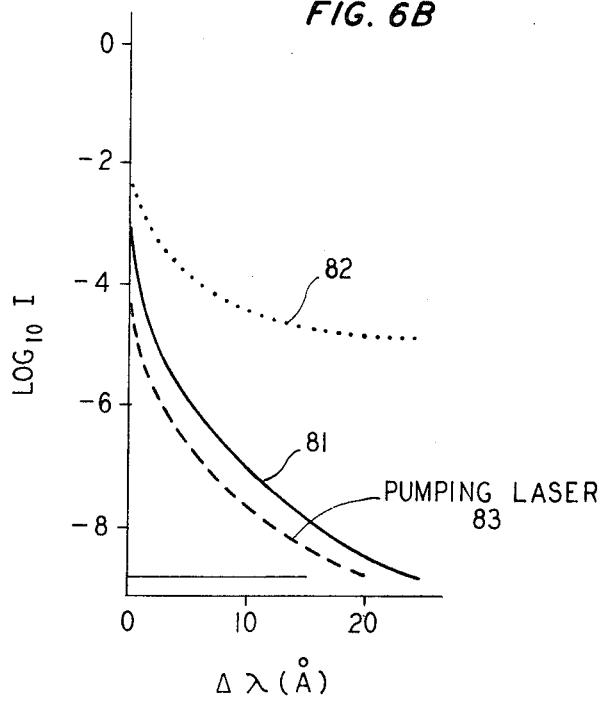

The elimination of the background fluorescence can be appreciated in part from the curves of FIGS. 6A and 6B in which the vertical or ordinate axes are plotted to the same scale in units of a logarithm of the output intensity and the horizontal axis or abscissa shows wavelength of the observed oscillating radiation. Curve 71, including the dye laser line 72 in FIG. 6A, is applicable to the prior art embodiments of FIGS. 1–3. Curves 81, 82 and 83 are applicable to the embodiment of FIG. 4. These spectra were obtained with a double spectrometer and an electrometer. The only difference in plotting the spectra is that in FIG. 6B the abscissa is labeled in terms of units of wavelength deviation from the dye laser line. It will be noted that in FIG. 6A the background fluorescence is substantial and is greater at a given wavelength displacement from the laser line 72 than for the clean output illustrated by curve 81 in FIG 6B for the embodiment of FIG. 4. For purposes of comparison, curve 82 shows the relative shape of the spectrum for the output still containing background fluorescence, that is, the output deflected in the downward direction of FIG. 4. Curve 83 shows the shape of the line of the argon ion pumping laser 11 in the same wavelength region. The closeness of curves 81 and 83 indicates the dramatic degree of improvement of broadly tunable dye laser output obtained in the embodiment of FIG. 4.

I claim:

1. An optical resonator comprising a principal resonator containing means including an active medium for generating both stimulated emission of radiation and background fluorescence and an auxiliary resonator coupled to said principal resonator, said auxiliary resonator including a tuning element that angularly disperses differing frequencies, said principal resonator including a partially transmissive reflector disposed between said tuning element and said active medium, and a beam splitter between said tuning element and said partially transmissive reflector to provide an output port for said auxiliary resonator at least for radiation propagating from said tuning element toward said partially transmissive reflector.

2. An optical resonator according to claim 1 in which the active medium comprises a dye laser medium having parallel major surfaces substantially at Brewster's angle to the axis of said resonator for radiation at its laser wavelength to polarize linearly said radiation transmitted therethrough, the tuning element is a diffraction grating and the beam splitter is a Glan-Thompson polarizer having its transmission polarization direction aligned with the polarization direction of said major surfaces of said laser medium and in which the auxiliary resonator includes a phase shifter between the tuning element and the beam splitter.

3. An optical resonator according to claim 2 in which the phase shifter is a reciprocal phase shifter that elliptically polarizes a linearly polarized beam propagating from the direction of the Glan-Thompson polarizer.

4. An optical resonator according to claim 1 including an aperture between the tuning element and the beam splitter.

* * * * *